United States Patent

Shimizu et al.

[11] Patent Number: 5,176,960
[45] Date of Patent: Jan. 5, 1993

[54] HIGH-STRENGTH SILICONE RUBBER PARTICULATE

[75] Inventors: Koji Shimizu; Keiji Yoshida, both of Chiba Prefecture, Japan

[73] Assignee: Dow Corning Toray Silicone Co., Ltd., Tokyo, Japan

[21] Appl. No.: 782,957

[22] Filed: Oct. 25, 1991

[30] Foreign Application Priority Data

Oct. 31, 1990 [JP] Japan .................. 2-294155

[51] Int. Cl.$^5$ ............ B32B 27/14; C04B 14/04; C08L 83/04
[52] U.S. Cl. ............... 428/405; 523/216; 524/847; 524/837; 524/861; 524/863; 524/860; 106/490
[58] Field of Search ............ 523/216; 524/847, 837, 524/861, 863, 860; 428/405; 106/490

[56] References Cited

U.S. PATENT DOCUMENTS

| | | | |
|---|---|---|---|
| 4,344,800 | 8/1982 | Lutz | 524/860 |
| 4,454,288 | 6/1984 | Lee et al. | 524/860 |
| 4,594,134 | 6/1986 | Hanada et al. | 522/99 |
| 4,609,486 | 9/1986 | Freiberg et al. | 252/310 |
| 4,743,670 | 5/1988 | Yoshida et al. | 528/15 |
| 4,749,765 | 6/1988 | Shimizu et al. | 528/15 |
| 4,857,564 | 8/1989 | Maxson | 523/216 |
| 4,950,502 | 8/1990 | Saam et al. | 427/213.36 |
| 4,978,710 | 12/1990 | Liles | 524/837 |

FOREIGN PATENT DOCUMENTS 350519 5/1986 European Pat. Off. .
59-68333 7/1984 Japan .
87-35396 4/1988 Japan .

Primary Examiner—Melvyn I. Marquis
Assistant Examiner—Karen A. Dean
Attorney, Agent, or Firm—Edward C. Elliott

[57] ABSTRACT

A hydrophobic silica is prepared by mixing and heating a mixture of (a) 100 weight parts wet-method silica and (b) 1 to 100 weight parts organopolysiloxane represented by the following average unit formula $R^1_a R^2_b SiO_{(4-a-b)/2}$, wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from zero to 0.45 inclusive. This hydrophobic silica is used to prepare a high-strength silicone rubber particulate by mixing with a curable dioranopolysiloxane and curing the mixture in the form of particulates. A preferred manner of making the particulates is by emulsifying the mixture of hydrophobic silica and curable diorganopolysiloxane in water, then spraying the emulsion into a hot gas to cure the silicone rubber composition and remove the water, giving microparticles of high-strength silicone rubber.

7 Claims, No Drawings

5,176,960

HIGH-STRENGTH SILICONE RUBBER PARTICULATE

Background of the invention

1. Field of the Invention

The present invention relates to a high-strength silicone rubber particulate and to a method for producing same.

2. Background Information

Methods known heretofore for the preparation of silicone rubber particulates include (1) pulverization or grinding by directly processing a silicone rubber in a grinder and (2) spraying an uncured liquid silicone rubber composition directly into a hot gas in order to bring about curing in the sprayed state (refer to Japanese Patent Application Laid Open [Kokai or Unexamined] Number 59-68333 [68,333/84] or U.S. Pat. No. 4,594,134, issued Jun. 10, 1986). Other methods are taught in U.S. Pat. No. 4,743,670, issued May 10, 1988 and U.S. Pat. No. 4,749,765, issued Jun. 7, 1988.

However, not only does the first method suffer from a poor productivity, but it is very poorly suited to the production of microfine silicone rubber powders. Moreover, the silicone rubber powder afforded by this approach presents an irregular or nonuniform morphology, is strongly aggregative and poorly dispersible, and evidences a poor lubricity. While the second method has an excellent productivity and gives a highly spherical particulate with a uniform morphology, it is difficult to obtain thereby a microfine silicone rubber particulate with a uniform particle size.

As a result of extensive research directed at solving the aforementioned problems, the present inventors have already discovered that a microfine silicone rubber particulate can be prepared by dispersing a diorganopolysiloxane-based liquid silicone rubber composition as the discontinuous phase in water to afford a water-based dispersion and by then bringing said dispersion into contact with a gas residing at a specific temperature in order to cure the liquid silicone rubber composition. This method has already been the subject of a patent application (refer to Japanese Patent Application Number 62-35396 [35,396/87] or European Application 350519).

However, this method is ill-suited to the production of a silicone rubber particulate having a high mechanical strength. Thus, when one attempts to increase the mechanical strength by increasing the degree of polymerization of the diorganopolysiloxane component, one encounters an excessive increase in the viscosity of the liquid silicone rubber composition, and this prevents preparation of a homogeneous water-based dispersion. When an increase in the mechanical strength is pursued through the addition of reinforcing filler (e. g., silica micropowder) to the liquid silicone rubber composition, the silica micropowder migrates from the liquid silicone rubber composition into the aqueous phase (dispersion medium). As a result, the liquid silicone rubber composition in the water-based dispersion is not compositionally stable, and a homogeneous silicone rubber particulate with a high mechanical strength cannot be produced.

SUMMARY OF THE INVENTION

A high strength silicone rubber particulate is prepared by using a hydrophobic silica prepared by treating wet-method silica with organopolysiloxane of the formula $R^1_a R^2_b SiO_{(4-a-b)/2}$, wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from zero to 0.45 inclusive.

The present invention takes as its objects the introduction of a silicone rubber particulate having a high mechanical strength and the introduction of a highly productive method for the preparation of a microfine silicone rubber particulate which has a uniform shape, uniform particle size, and a high strength and particularly a high mechanical strength.

DESCRIPTION OF THE INVENTION

The present invention relates to a high-strength silicone rubber particulate containing from 3 to 30 weight percent of hydrophobic silica, said silica prepared by mixing and heating for 1 to 3 hours at a temperature of from 150° to 400° C. (a) 100 weight parts wet-method silica and (b) 1 to 100 weight parts organopolysiloxane represented by the following average unit formula $R^1_a R^2_b SiO_{(4-a-b)/2}$, wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from to 0.45 inclusive and having a viscosity of from 5 to 1000 centipoise (0.005 to 1 Pa.s).

The present invention also relates to a method for the preparation of a high-strength silicone rubber particulate wherein said method I mixes (A) 100 weight parts diorganopolysiloxane having silicon-bonded hydroxyl or alkenyl at the molecular chain terminals, (B) organohydrogenpolysiloxane having at least 3 silicon-bonded hydrogen atoms in each molecule, in a quantity sufficient to cure component (A), (C) 3 to 50 weight parts hydrophobic silica prepared by a hydrophobicization which is carried out by mixing and heating (a) 100 weight parts wet method silica and (b) 1 to 100 weight parts organopolysiloxane represented by the following average unit formula $R^1_a R^2_b SiO_{(4-a-b)/2}$, wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from zero to 0.45 inclusive, and (D) a catalytic quantity of a curing catalyst; II. then disperses the aforesaid liquid silicone rubber composition in surfactant-containing water to give a water-based emulsion in which the aforesaid composition is dispersed as the discontinuous phase in the water; and III. subsequently contacts the aforesaid emulsion with a gas which resides at a temperature higher than the temperature of the water therein in order to bring about a complete cure of the aforesaid silicone rubber composition while simultaneously evaporating the water.

To explain the preceding in greater detail, the hydrophobic silica employed in the present invention's high-strength silicone rubber particulate is prepared by mixing and heating the wet-method silica comprising the aforesaid component (a) and the organopolysiloxane comprising component (b). The wet-method silica comprising component (a) is itself prepared by the production of silica by the addition of acid under wet conditions to an alkali metal silicate such as sodium silicate.

The organopolysiloxane comprising component (b) is a treatment agent which hydrophobicizes component (a), and it is principally a straight-chain or cyclic organopolysiloxane with the following average unit formula:

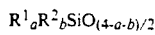
$$R^1{}_a R^2{}_b SiO_{(4-a-b)/2}$$

wherein $R^1$ is a monovalent hydrocarbon group selected from, for example, methyl, ethyl, propyl, octyl, vinyl, 3,3,3-trifluoropropyl, and phenyl; $R^2$ is the hydrogen atom; a is from 1 to 3 inclusive, and b is from zero to 1 inclusive with the provisos that a+b is from 1.90 to 2.10 inclusive and b/(a+b) equals from zero to 0.45. The content of silicon-bonded hydrogen in this organopolysiloxane should fall within the range of b/(a+b) equals zero to 0.45, i. e., up to 45 mole percent of the total number of silicon-bonded substituent groups.

The aforesaid organopolysiloxane is exemplified by trimethylsiloxy-terminated dimethylpolysiloxanes, trimethylsiloxy-terminated methylhydrogenpolysiloxanes, trimethylsiloxy-terminated dimethylsiloxane-methylhydrogensiloxane copolymers, and dimethylhydrogensiloxy-terminated dimethylsiloxane-methylhydrogensiloxane copolymers.

The viscosity of this organopolysiloxane is not specifically limited, but viscosities of 5 to 1.000 centipoise are preferred. This organopolysiloxane treatment agent should be added at 1 to 100 weight parts and preferably at 5 to 30 weight parts per 100 weight parts wet-method silica comprising component (a). In order to prepare the hydrophobic silica under consideration, components (a) and (b) are mixed according to the specified proportions and heated. The preferred conditions are heat treatment at 150 to 400 degrees Centigrade for 1 to 3 hours. A catalyst is not specifically required here, but a catalyst may be present within a range which does not compromise the physical or chemical properties of the hydrophobic silica.

The high-strength silicone rubber particulate according to the present invention must contain 3 to 30 weight percent and preferably 5 to 30 weight percent of the aforesaid hydrophobic silica.

Those silicone rubbers known in the art may be employed as the silicone rubber component of the high-strength silicone rubber particulate according to the present invention. Examples in this regard are as follows:
- organoperoxide-curing silicone rubbers in which vinyl-containing diorganopolysiloxane is cured by organoperoxide;
- addition reaction-curing silicone rubbers in which curing proceeds through the addition reaction of diorganopolysiloxane having silicon-bonded vinyl with SiH-containing diorganopolysiloxane under platinum catalysis;
- condensation reaction-curing silicone rubbers in which curing proceeds by a dehydrogenation reaction between hydroxyl-terminated diorganopolysiloxane and SiH-containing diorganopolysiloxane in the presence of an organotin compound; and
- condensation reaction-curing silicone rubbers in which hydroxyl-terminated diorganopolysiloxane and hydrolyzable organosilane are condensed in the presence of an organotin compound or titanate ester.

The latter two types (addition reaction-curing and condensation reaction-curing) are preferred by the present invention for their ease of handling and ease of production of the silicone rubber particulate according to the present invention.

Furthermore, the high-strength silicone rubber particulate according to the present invention preferably has a particle size not exceeding 1 mm and preferably has a spherical morphology.

The method for producing the high-strength silicone rubber particulate according to the present invention is explained in the following.

The component (A) in this preparative method functions to develop rubbery elasticity through its reaction with component (B) under catalysis by component (D). Component (A) comprises diorganopolysiloxane which has silicon-bonded hydroxyl or alkenyl (e. g., vinyl, allyl, propenyl, hexenyl) at its molecular chain terminals. Its other silicon-bonded organic groups will comprise monovalent hydrocarbon groups as exemplified by alkyl groups such as methyl, ethyl, propyl, and butyl; alkenyl groups such as vinyl, allyl, propenyl, and hexenyl; aryl groups such as phenyl; aralkyl groups such as benzyl; cycloalkyl groups such as cyclohexyl and cyclopentyl; and groups obtained by replacing part or all of the hydrogen in the aforesaid organic groups with halogen (e. g., fluorine, chlorine, bromine), for example, 3-chloropropyl and 3,3,3-trifluoropropyl. While these organic groups are typically methyl, vinyl, and phenyl, they need not all be identical and combinations of different organic groups may be employed. The molecular structure should be essentially linear, which encompasses both straight chain and slightly branched straight chains. The molecular weight should generally correspond to a viscosity at 25 degrees Centigrade of 100 to 100,000 centistokes. Hydroxyl-containing diorganopolysiloxanes within the scope of component (A) are exemplified by hydroxyl-terminated dimethylpolysiloxanes, hydroxyl-terminated dimethylsiloxane-methylphenylsiloxane copolymers, and hydroxyl-terminated methylvinylsiloxane-dimethylsiloxane copolymers. The alkenyl-containing diorganopolysiloxanes are exemplified by dimethylvinylsiloxy-terminated dimethylpolysiloxanes, dimethylvinylsiloxy-terminated dimethylsiloxane-methylvinylsiloxane copolymers, and dimethylvinylsiloxy-terminated dimethylsiloxane-methylphenylsiloxane copolymers. The aforesaid diorganopolysiloxanes may be synthesized by those methods already known to the art, for example, by the ring-opening polymerization of cyclic diorganosiloxane oligomer, or by the hydrolysis-condensation of linear diorganosiloxane oligomer having hydrolyzable groups (e. g., alkoxy, acyloxy, etc.) at both molecular chain terminals.

Component (B) functions as a crosslinker for component (A), and comprises organohydrogenpolysiloxane having at least 3 silicon-bonded hydrogen atoms in each molecule. The hydrogen may be bonded at the molecular terminals, or within the chain, or at both positions. The silicon-bonded organic groups again comprise monovalent hydrocarbon groups as exemplified by alkyl groups such as methyl, ethyl, propyl, and octyl; aryl groups such as phenyl; and substituted alkyl groups such as 3,3,3-trifluoropropyl; however, alkenyl groups are excluded from this component. The molecular configuration of component (B) is typically linear or cyclic, but branched and network configurations may be used.

This organohydrogenpolysiloxane preferably has a degree of polymerization corresponding to viscosities within the range of 1 to 100,000 centipoise at 25 degrees Centigrade. At less than 1 centipoise, the volatility becomes so high that the content of component (B) in the liquid silicone rubber composition will be unstable. Values in excess of 100,000 centipoise substantially impair the industrial productivity. The SiH content in each molecule of this organohydrogenpolysiloxane preferably does not exceed 2 weight percent.

The component (B) under consideration should be added in a quantity sufficient to cure or crosslink component (A), i.e., a quantity sufficient to convert the liquid silicone rubber composition into a rubbery elastomer. As a general matter, this corresponds to quantities which afford values of (0.5:1.0) to (20:1.0) and preferably (1.0:1.0) to (10:1.0) for the ratio between the number of moles of silicon-bonded hydrogen atoms in this component and the number of moles of silicon-bonded hydroxyl groups and/or silicon-bonded alkenyl groups in component (A).

The hydrophobic silica comprising component (C) is the essential component for improving the mechanical strength of the silicone rubber particulate afforded by the preparative method according to the present invention. This hydrophobic silica corresponds to the hydrophobic silica which is prepared, as described hereinbefore, by mixing and heating the wet-method silica comprising the component (a) described above with the organopolysiloxane comprising the component (b) described above. This component should be added at 3 to 50 weight parts per 100 weight parts component (A).

The curing catalyst comprising component (D) functions to accelerate the crosslinking reaction between component (A) and component (B). When component (A) is an hydroxyl-containing diorganopolysiloxane, a condensation reaction catalyst should be used in order to accelerate the dehydrogenation reaction between the hydroxyl group and silicon-bonded hydrogen in component (B). These condensation reaction catalysts are exemplified by the metal salts of organic acids, such as dibutyltin dilaurate, dibutyltin diacetate, tin octanoate, dibutyltin dioctoate, tin laurate, ferric stannooctanoate, lead octanoate, lead laurate, and zinc octanoate; by titanate esters, such as tetrabutyl titanate, tetrapropyl titanate, and dibutoxytitanium bis(ethyl acetoacetate); by amine compounds, such as n-hexylamine and guanidine, and by hydrochlorides thereof; and by platinum compounds such as chloroplatinic acid, chloroplatinic acid dissolved in alcohol or ketone, chloroplatinic acid/diketone complexes, platinum black, and supported platinum.

In the case of the metal salts of organic acids, titanate esters, amine compounds, and amine hydrochlorides, the condensation reaction catalyst should be added generally within the range of 0.01 to 5 weight parts and preferably within the range of 0.05 to 2 weight parts, in each case per 100 weight parts component (A). In the case of a platinum compound catalyst, the condensation reaction catalyst should be added generally within the range of 0.1 to 1.000 weight parts and preferably within the range of 1 to 100 weight parts, in each case as platinum metal per 1,000,000 weight parts of the total quantity of components (A) plus (B).

On the other hand, a platinum-type catalyst will be used when component (A) is an alkenyl-containing diorganopolysiloxane. The platinum-type catalyst under consideration is exemplified by platinum-type compounds such as chloroplatinic acid, chloroplatinic acid dissolved in alcohol or ketone, chloroplatinic acid/diketone complexes, chloroplatinic acid/divinyldisiloxane complexes, platinum black, and supported platinum. This platinum catalyst should be added generally at 0.1 to 1,000 weight parts and preferably at 1 to 100 weight parts, in each case as platinum metal per 1,000,000 weight parts of the total quantity of components (A) plus (B).

On the subject of the present invention's preparative method, a liquid silicone rubber composition is first prepared from the aforementioned components (A) through (D), and a water-based emulsion of this liquid silicone rubber composition is then prepared by dispersing same in water. The liquid silicone rubber composition is preferably prepared by mixing its constituent components at low temperatures. Thus, the mixing temperature should fall within the range of −60 to +10 degrees Centigrade and preferably within the range of −30 to +5 degrees Centigrade. Temperatures below −60 degrees Centigrade result in gelation of the diorganopolysiloxane comprising the component (A) employed by the present invention. The curing reaction will develop during the mixing process when the temperature exceeds +10 degrees Centigrade. In either case it becomes very difficult to prepare a homogeneous water-based emulsion of a homogeneous liquid silicone rubber composition.

The emulsion under consideration can be prepared by various methods. In one method, surfactant and water are added to the liquid silicone rubber composition, and the emulsion is developed by passage through a commercial emulsifying device, for example, a homomixer, homogenizer, or colloid mill. In another method, the constituent components of the liquid silicone rubber composition are introduced into a homomixer, the surfactant is introduced with mixing, and the water is then added with stirring. The surfactant used here encompasses those nonionic surfactants, ionic surfactants, and emulsifiers heretofore regarded as useful for silicone emulsions. While the type of surfactant is not particularly restricted, surfactant should be avoided which contains atoms or functional groups which would react with the silicon-bonded hydrogen atoms in component (B) or impair the activity of same. The surfactant will generally be used at 0.1 to 30 weight parts and preferably at 0.5 to 10 weight parts, in each case per 100 weight parts water. The water-based emulsion of the liquid silicone rubber composition is preferably prepared at temperatures of from zero to 25 degrees Centigrade.

Once prepared, the water-based emulsion of the liquid silicone rubber composition is brought into contact with a gas residing at a temperature higher than that of the water in the emulsion in order to bring about a complete cure of the silicone rubber composition while at the same time evaporating off the water. In this process, when the water-based emulsion of the liquid silicone rubber composition is allowed to stand at room or elevated temperatures for an extended period of time after emulsion preparation, curing of the liquid silicone rubber composition may develop to give a water-based emulsion of a semi-cured silicone rubber particulate. The liquid silicone rubber composition water-based emulsions which are within the scope of this process according to the present invention include such emulsions in which curing has in fact developed. In other words, for the purposes of the present invention, the liquid silicone rubber composition water-based emulsion encompasses liquid silicone rubber composition water-based emulsions in which curing has not occurred, liquid silicone rubber composition water-based emulsions in which curing has developed to some degree, and even those water-based emulsions in which substantial curing has already occurred to the point that they might rather be considered to be the emulsions of a silicone rubber particulate.

The gas used in this process is not specifically restricted as long as it is capable of bringing about the thermal cure of the silicone rubber composition present in the water-based emulsion, but flammable gases should be avoided. This gas is concretely exemplified by air, nitrogen, and the gases originating from various nonflammable liquids.

Numerous methods are available for bringing the water-based emulsion into contact with the gas. One method consists of spraying the water-based emulsion into a hot nitrogen current in order to complete the cure of the liquid silicone rubber composition while in the sprayed state while simultaneously scattering out and removing the water fraction.

The high-strength silicone rubber particulate according to the present invention may be directly applied in its native form or it may be used in combination with other materials. When used in combination with another material, it will improve the physical properties (mechanical strength, water resistance, lubricity, etc.) of the material to which it is added.

In this case, one can contemplate the following as the host or matrix for the silicone rubber particulate according to the present invention: the various organic resins, solid lubricants, water repellents, release agents, tack inhibitors or eliminators, greases, oils, cements, plasters, paints, casting materials, molding materials, films, and substances for agrichemical and medical applications.

Because the high-strength silicone rubber particulate according to the present invention contains a specified quantity of a special hydrophobic silica, it characteristically exhibits an excellent mechanical strength.

Moreover, the preparative method according to the present invention can characteristically provide, in a very efficient manner, a microfine silicone rubber particulate having a uniform particle size and in particular a high-strength silicone rubber particulate with a high mechanical strength.

The following examples are included for illustrative purposes only and should not be construed as limiting the invention which is properly set forth in the appended claims. All parts are parts by weight, cp equals centipoise, and the viscosity is the value at 25 degrees Centigrade.

EXAMPLE 1

First, 10 parts trimethylsiloxy-terminated dimethylpolysiloxane with a viscosity of 100 cp was mixed to homogeneity into 100 parts wet-method silica micropowder (specific surface area of 75 m2/g), and the mixture was then heated for 2 hours at 300 degrees Centigrade to afford a silica micropowder whose surface was treated with dimethylpolysiloxane (dimethylpolysiloxane-treated silica micropowder).

Then 150 parts hydroxyl-terminated dimethylpolysiloxane with a viscosity of 2,500 cp, 40 parts of the dimethylpolysiloxane-treated silica micropowder as prepared above, and 30 parts hydroxyl-terminated dimethylpolysiloxane with a viscosity of 50 cp were mixed to homogeneity and the composition was cooled to −10 degrees Centigrade.

To the composition thus obtained were added 10 parts trimethylsiloxy-terminated methylhydrogenpolysiloxane with a viscosity of 10 cp (silicon-bonded hydrogen content of 1.5 weight percent) and 2.0 parts dibutyltin dioctoate, and a liquid silicone rubber composition was obtained by mixing to homogeneity. While mixing and dispersing at 6,000 rpm in a Lab Disperser from Tokushu Kika Kogyo Kabushiki Kaisha, 700 parts ion-exchanged water (preliminarily cooled to +10 degrees Centigrade) containing 2 weight percent nonionic surfactant was added to the liquid silicone rubber composition as prepared above to give a water-based silicone rubber emulsion. The nonionic surfactant was a trimethylnonanol/ethylene oxide adduct (Tergitol TMN-6 from Union Carbide Corporation). This water-based emulsion was placed in a colloid mill (from the Manton-Gaulin Company) and milled on a 0.1 mm gap at 1,400 rpm to give a water-based emulsion of the liquid silicone rubber composition.

This water-based emulsion was allowed to stand for 5 hours at room temperature. Curing developed in the silicone rubber composition present in the water-based emulsion to yield a semi-cured silicone rubber particulate. The water-based emulsion was then continuously sprayed into a spray dryer tank using a hot nitrogen current in order to induce a complete cure of the silicone rubber composition while at the same time evaporating off the water. The temperature of the hot nitrogen current was 300 degrees Centigrade at the spray dryer inlet and 110 degrees Centigrade at the outlet. The silicone rubber powder product was inspected under a scanning electron microscope: it was found to be spherical with an average particle size of 10 micrometers. The silica micropowder content of the obtained silicone rubber particulate was measured at 15.5 weight percent.

In addition, the aforementioned liquid silicone rubber composition itself was cured at room temperature to give a 2 mm-thick silicone rubber sheet, and the mechanical properties of this sheet were measured. These results are reported for reference purposes in Table 1 below. The silica micropowder content of this silicone rubber sheet was also measured at 15.5 weight percent.

EXAMPLE 2

First 180 parts hydroxyl-terminated dimethylpolysiloxane with a viscosity of 2,500 cp, 20 parts dimethylpolysiloxane-treated silica micropowder as prepared in Example 1, and 30 parts hydroxyl-terminated dimethylpolysiloxane with a viscosity of 50 cp were combined and mixed. Into this was mixed 12 parts trimethylsiloxy-terminated methylhydrogenpolysiloxane with a viscosity of 10 cp (silicon-bonded hydrogen content of 1.5 weight percent) to give a mixture designated as mixture (A).

Next, 180 parts of the same dimethylpolysiloxane with viscosity of 2,500 cp as above, 20 parts of the dimethylpolysiloxane-treated silica micropowder, and 30 parts of the same dimethylpolysiloxane with viscosity of 50 cp as above were combined and mixed. Into this were mixed 12 parts glycidyl methacrylate and 2.0 parts dibutyltin dioctoate to give a mixture designated as mixture (B).

Mixtures (A) and (B) were placed in separate storage tanks and cooled to −10 degrees Centigrade.

Then 500 parts of mixture (A) and 500 parts of mixture (B) were simultaneously fed through a static mixer (from Tokushu Kika Kogyo Kabushiki Kaisha) and thus mixed to homogeneity to give a liquid silicone rubber composition. Then 3,000 parts of a 2 weight percent solution of nonionic surfactant in ion-exchanged water was added to 1,000 parts of this composition, and this was mixed and dispersed at 4,000 rpm in a Lab Disperser while being fed to a colloid mill. Milling at 1,400 rpm on a 0.1 mm gap afforded a water-based emulsion of the liquid silicone rubber composition. The nonionic surfactant was a trimethylnonanol-/ethylene oxide adduct (Tergitol TMN-6 from Union Carbide Corporation).

This water-based emulsion was allowed to stand for 5 hours at room temperature, during which time curing of the silicone rubber composition developed. The water-based emulsion was then continuously sprayed into a spray dryer chamber using a hot nitrogen current in order to evaporate off the water fraction. The temperature of the hot nitrogen current was 300 degrees Centigrade at the spray dryer inlet and 45 degrees Centigrade at the spray dryer outlet. The silicone rubber powder product was inspected under a scanning electron microscope: it was spherical with an average particle size of 10 micrometers. The silica micropowder content of this silicone rubber powder was measured at 15.5 weight percent.

This silicone rubber particulate was then added to a paint composition, and the film properties were evaluated.

Thus, 100 parts epoxy resin paint ("Million" White from Kansai Paint Kabushiki Kaisha), 100 parts of the silicone rubber powder prepared as above, and 50 parts toluene were placed in a 500 cc metal container, followed by the addition of 10 ceramic balls (10 mm in diameter). This was followed by mixing for 3 hours at 200 rpm on a pot mill rotator from Nitto Kagaku Kabushiki Kaisha. The mixture thus obtained was mixed with 25 parts curing agent for epoxy resin to give a paint composition. This paint composition was applied to Teflon film and air-dried at room temperature for 24 hours: a satin-finish-like cured film was formed on the Teflon film. This film had a soft suede-like sensation to the touch. When a fingernail scratch test was conducted in order to evaluate the surface strength of the film, there was absolutely no fracture or removal of the silicone rubber particulate. When the film was inspected under a scanning electron microscope after the scratch test, it was observed that the silicone rubber particulate remained completely bonded in the epoxy resin paint.

In addition, the aforementioned liquid silicone rubber composition itself was cured at room temperature to give a 2 mm-thick silicone rubber sheet, and the mechanical properties of this sheet were measured. These results are reported for reference purposes in Table 1 below. The silica micropowder content of this silicone rubber sheet was also measured at 15.5 weight percent.

EXAMPLE 3

First 250 parts dimethylvinylsiloxy-terminated dimethylpolysiloxane with a viscosity of 500 cp (vinyl content of 0.5 weight percent), 50 parts of the dimethylpolysiloxane-treated silica as prepared in Example 1, and 10 parts trimethylsiloxy-terminated methylhydrogenpolysiloxane with a viscosity of 10 cp (SiH content of 1.0 weight percent) were combined and mixed and the composition thus obtained was cooled to −10 degrees Centigrade.

Next, 0.7 parts isopropanolic chloroplatinic acid solution (platinum content of 3.0 weight percent) was added to the composition prepared above, and this was immediately followed by the addition of 400 parts ion-exchanged water containing 5 weight percent nonionic surfactant (same as in Example 1) while simultaneously mixing and dispersing at 6,000 rpm using a Lab Disperser from Tokushu Kika Kogyo Kabushiki Kaisha. This was milled at 1,400 rpm on a 0.1 mm gap using a colloid mill (from the Manton-Gaulin Company) to give a water-based emulsion of the liquid silicone rubber composition. The liquid silicone rubber composition in this water-based emulsion did not undergo any curing. It was subsequently continuously sprayed into a spray dryer using a hot nitrogen current in order bring about a complete cure of the liquid silicone rubber composition while simultaneously evaporating off the water fraction. The hot nitrogen current had a temperature of 300 degrees Centigrade at the spray dryer inlet and 45 degrees Centigrade at the outlet. The silicone rubber powder was inspected under a scanning electron microscope: it was spherical with an average particle size of 10 micrometers. The silica micropowder content of the silicone rubber powder product was measured at 14 weight percent.

In addition, the aforementioned liquid silicone rubber composition itself was cured at room temperature to give a 2 mm-thick silicone rubber sheet, and the mechanical properties of this sheet were measured. These results are reported for reference purposes in Table 1 below.

EXAMPLE 4

First 100 parts wet-method silica with a specific surface area of 110 m2/g and 10 parts trimethylsiloxy-terminated dimethylsiloxane-methylhydrogensiloxane copolymer (silicon-bonded hydrogen content of 0.4 weight percent) were combined and mixed followed by heating for 2 hours at 300 degrees Centigrade to afford a silica micropowder whose surface was treated with methylhydrogenpolysiloxane.

Then 150 parts hydroxyl-terminated dimethylpolysiloxane with a viscosity of 2,500 cp, 40 parts silica micropowder as prepared above (surface-treated with methylhydrogenpolysiloxane), and 30 parts hydroxyl-terminated dimethylpolysiloxane with a viscosity of 50 cp were mixed to homogeneity, and the composition thus obtained was cooled to −10 degrees Centigrade.

Then 10 parts trimethylsiloxy-terminated methylhydrogenpolysiloxane with a viscosity of 10 cp (silicon-bonded hydrogen content of 1.5 weight percent) and 2.0 parts dibutyltin dioctoate were added to the composition prepared as above with mixing to homogeneity.

Next, 700 parts of a 2 weight percent solution of nonionic surfactant in ion-exchanged water (+10 degrees Centigrade) was then added to the aforesaid mixture while mixing and dispersing at 6,000 rpm in a Lab Disperser from Tokushu Kika Kogyo Kabushiki Kaisha. The nonionic surfactant was a trimethylnonanol-/ethylene oxide adduct (Tergitol TMN-6 from Union Carbide Corporation). This was then introduced into a colloid mill (from the Manton-Gaulin Company) and milled at 1,400 rpm on a 0.1 mm gap to afford a water-based emulsion of the liquid silicone rubber composition.

This emulsion was allowed to stand for 5 hours at room temperature, and was then continuously sprayed into a spray dryer chamber using a hot nitrogen current in order to bring about a complete cure of the liquid silicone rubber composition while the water was simultaneously evaporated off. The temperature of the hot nitrogen current was 300 degrees Centigrade at the inlet to the spray dryer and was 110 degrees Centigrade at the outlet. The silicone rubber powder product was inspected under a scanning electron microscope: its morphology was spherical and its average particle size was 25 micrometers. The silica micropowder content of the silicone rubber powder product was measured at 15.5 weight percent.

In addition, the aforementioned liquid silicone rubber composition itself was cured at room temperature to give a 2 mm-thick silicone rubber sheet, and the mechanical properties of this sheet were measured. These results are reported for reference purposes in Table 1 below.

The silica micropowder content of this silicone rubber sheet was also measured at 15.5 weight percent.

COMPARISON EXAMPLE 1

First 180 parts hydroxyl-terminated dimethylpolysiloxane with a viscosity of 2,500 cp, 20 parts dry-method silica micropowder (Aerosil 200 from Nippon Aerosil Kabushiki Kaisha, specific surface area of 200 m2/g), and 30 parts hydroxyl-terminated dimethylpolysiloxane with a viscosity of 50 cp were combined and mixed and the composition thus obtained was cooled to $-10$ degrees Centigrade.

Next 10 parts trimethylsiloxy-terminated methylhydrogenpolysiloxane with a viscosity of 10 cp (silicon-bonded hydrogen content of 1.5 weight percent) and 2.0 parts dibutyltindioctoate were added and mixed into the composition prepared as above. When mixing/dispersing was conducted at 6,000 rpm using a Lab Disperser (Tokushu Kika Kogyo Kabushiki Kaisha) while adding 700 parts ion-exchanged water containing 2 percent nonionic surfactant as used in Example 1, it was observed that the silica micropowder migrated into the surfactant-containing aqueous phase and that a good-quality water-based emulsion of the liquid silicone rubber composition could not be prepared. When this water-based emulsion was allowed to stand without modification for a while, the water and liquid silicone rubber composition underwent separation and gelation was thereby increased. In addition, a homogeneous water-based emulsion could not be obtained even when emulsification was carried out using a colloid mill instead of the Lab Disperser.

COMPARISON EXAMPLE 2

A water-based emulsion of a liquid silicone rubber composition was prepared as in Example 2, but in the present case omitting the silica micropowder employed in Example 2. The liquid silicone rubber composition was sprayed into a hot gas current as in Example 2 to give a silicone rubber powder with an average particle size of 5 micrometers.

This silicone rubber powder was mixed and dispersed into an epoxy resin paint and a film was prepared again as in Example 2. When the fingernail scratch test was conducted as in Example 2, a whitening phenomenon was generated on the film surface. The film surface was then evaluated under a scanning electron microscope, and it was found thereby that this whitening phenomenon was caused by fracture and destruction of the silicone rubber particulate.

The mechanical properties of this liquid silicone rubber composition were measured as in Example 1, and these results are reported for reference purposes in Table 1 below.

TABLE I

| | Example 1 | Example 2 | Example 3 | Example 4 | Comp. Example 2 |
|---|---|---|---|---|---|
| specific gravity | 1.09 | 1.02 | 1.08 | 1.09 | 0.98 |
| hardness (JIS A) | 40 | 23 | 35 | 42 | 15 |
| tensile strength (kg/cm2) | 30 | 15 | 30 | 33 | 2 |
| elongation (%) | 260 | 200 | 300 | 300 | 50 |

That which is claimed is:

1. High-strength silicone rubber particulate containing from 3 to 30 weight percent of hydrophobic silica, said silica prepared by mixing and heating for 1 to 3 hours at a temperature of from 150° to 400° C.
   (a) 100 weight parts wet-method silica and
   (b) 1 to 100 weight parts organopolysiloxane represented by the following average unit formula $$R^1_a R^2_b SiO_{(4-a-b)/2}$$

wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from zero to 0.45 inclusive, and having a viscosity of from 5 to 1000 centipoise (0.0005 to 1 Pa.s).

2. Method for the preparation of a high-strength silicone rubber particulate wherein said method
   I mixes
   (A) 100 weight parts diorganopolysiloxane having silicon-bonded hydroxyl or alkenyl at the molecular chain terminals,
   (B) organohydrogenpolysiloxane having at least 3 silicon-bonded hydrogen atoms in each molecule, in a quantity sufficient to cure component (A),
   (C) 3 to 50 weight parts hydrophobic silica prepared by a hydrophobicization which is carried out by mixing and heating
      (a) 100 weight parts wet-method silica and
      (b) 1 to 100 weight parts organopolysiloxane represented by the following average unit formula $$R^1_a R^2_b SiO_{(4-a-b)/2}$$

wherein $R^1$ is a monovalent hydrocarbon group, $R^2$ is the hydrogen atom, a is from 1 to 3 inclusive, and b is from zero to 1 inclusive, with the provisos that $a+b$ is from 1.90 to 2.10 inclusive and $b/(a+b)$ is from zero to 0.45 inclusive, and having a viscosity of from 5 to 1000 centipoise (0.005 to 1 Pa.s)
   and
   (D) a catalytic quantity of a curing catalyst;
   II then disperses the aforesaid liquid silicone rubber composition in surfactant-containing water to give a water-based emulsion in which the aforesaid composition is dispersed as the discontinuous phase in the water; and
   III subsequently contacts the aforesaid emulsion with a gas which resides at a temperature higher than the temperature of the water therein in order to bring about a complete cure of the aforesaid silicone rubber composition while simultaneously evaporating the water.

3. The method of claim 2 where (b) is from 5 to 30 weight parts per 100 weight parts of (a) and has a viscosity of from 5 to 1000 centipoise.

4. The method of claim 3 where (b) is trimethylsiloxy terminated dimethylpolysiloxane.

5. The method of claim 3 where (b) is trimethylsiloxy terminated dimethylsiloxane-methylhydrogensiloxane copolymer.

6. The method of claim 2 in which the heating of step (C) comprises heating for 1 to 3 hours at a temperature of from 150° to 400° C.

7. The high-strength silicone rubber particulate produced by the method of claim 2.

* * * * *